US010132233B2

(12) United States Patent
Keim et al.

(10) Patent No.: US 10,132,233 B2
(45) Date of Patent: Nov. 20, 2018

(54) COMPRESSOR MAP BASED DRIVEN TURBOCHARGER CONTROL SYSTEM

(71) Applicant: VANDYNE SUPERTURBO, INC., Loveland, CO (US)

(72) Inventors: Jason Keim, Loveland, CO (US); Jared William Brown, Loveland, CO (US)

(73) Assignee: SuperTurbo Technologies, Inc., Loveland, CO (US)

( * ) Notice: Subject to any disclaimer, the term of this patent is extended or adjusted under 35 U.S.C. 154(b) by 92 days.

(21) Appl. No.: 15/282,723

(22) Filed: Sep. 30, 2016

(65) Prior Publication Data

US 2017/0130644 A1    May 11, 2017

Related U.S. Application Data

(60) Provisional application No. 62/248,107, filed on Oct. 29, 2015.

(51) Int. Cl.
*F02B 37/14* (2006.01)
*F02D 41/14* (2006.01)
(Continued)

(52) U.S. Cl.
CPC .............. *F02B 37/14* (2013.01); *F02B 33/40* (2013.01); *F02B 37/10* (2013.01); *F02B 37/105* (2013.01); *F02B 39/04* (2013.01); *F02B 39/10* (2013.01); *F02D 41/0007* (2013.01); *F02D 41/1401* (2013.01); *F02B 2037/122* (2013.01); *F02D 2041/1409* (2013.01); *F02D 2041/1433* (2013.01); *F02D 2200/0402* (2013.01);
(Continued)

(58) Field of Classification Search
CPC ........ F02B 37/14; F02B 39/04; F02B 37/105; F02B 33/40; F02B 37/10; F02B 39/10; F02B 2037/122; F02D 41/1401; F02D 41/0007; F02D 2041/1409; F02D 2200/703; F02D 2200/0402; F02D 2041/1433; F02D 2200/0414; Y02T 10/144
USPC ........................................ 60/607, 608, 605.1
See application file for complete search history.

(56) References Cited

U.S. PATENT DOCUMENTS 6,883,324 B2 *   4/2005   Igarashi ................. F02B 33/40
                                                          123/564
8,668,614 B2 *   3/2014   Sherrill ................... F16H 13/10
                                                          475/183

(Continued)

FOREIGN PATENT DOCUMENTS

DE    102008044156 A1    6/2010

OTHER PUBLICATIONS

U.S. Appl. No. 62/248,107 Compressor Map Based Driven Turbocharger Control System, filed Oct. 29, 2015.

*Primary Examiner* — Hoang Nguyen
(74) *Attorney, Agent, or Firm* — William W. Cochran; Cochran Freund & Young LLC

(57) ABSTRACT

An engine system and method utilizing a compressor map to control compressor speed of a driven turbocharger in the engine system is provided. A desired compressor speed is determined that corresponds to a boost pressure and to a mass flow rate of intake from the compressor map. The transmission of the driven turbocharger is shifted to a ratio that drives the compressor to a desired speed to provide the desired boost pressure and air flow to the engine system.

23 Claims, 7 Drawing Sheets

(51) Int. Cl.
*F02B 33/40* (2006.01)
*F02B 37/10* (2006.01)
*F02B 39/10* (2006.01)
*F02D 41/00* (2006.01)
*F02B 39/04* (2006.01)
*F02B 37/12* (2006.01)

(52) U.S. Cl.
CPC ............ *F02D 2200/0414* (2013.01); *F02D 2200/703* (2013.01); *Y02T 10/144* (2013.01)

(56) References Cited

U.S. PATENT DOCUMENTS

| | | | |
|---|---|---|---|
| 8,677,751 B2 * | 3/2014 | VanDyne | F01N 3/103 60/606 |
| 2009/0055072 A1 * | 2/2009 | He | F02D 41/0007 701/102 |
| 2014/0174076 A1 * | 6/2014 | VanDyne | F02B 37/105 60/602 |
| 2016/0024997 A1 * | 1/2016 | Buschur | F02B 37/10 60/607 |

\* cited by examiner

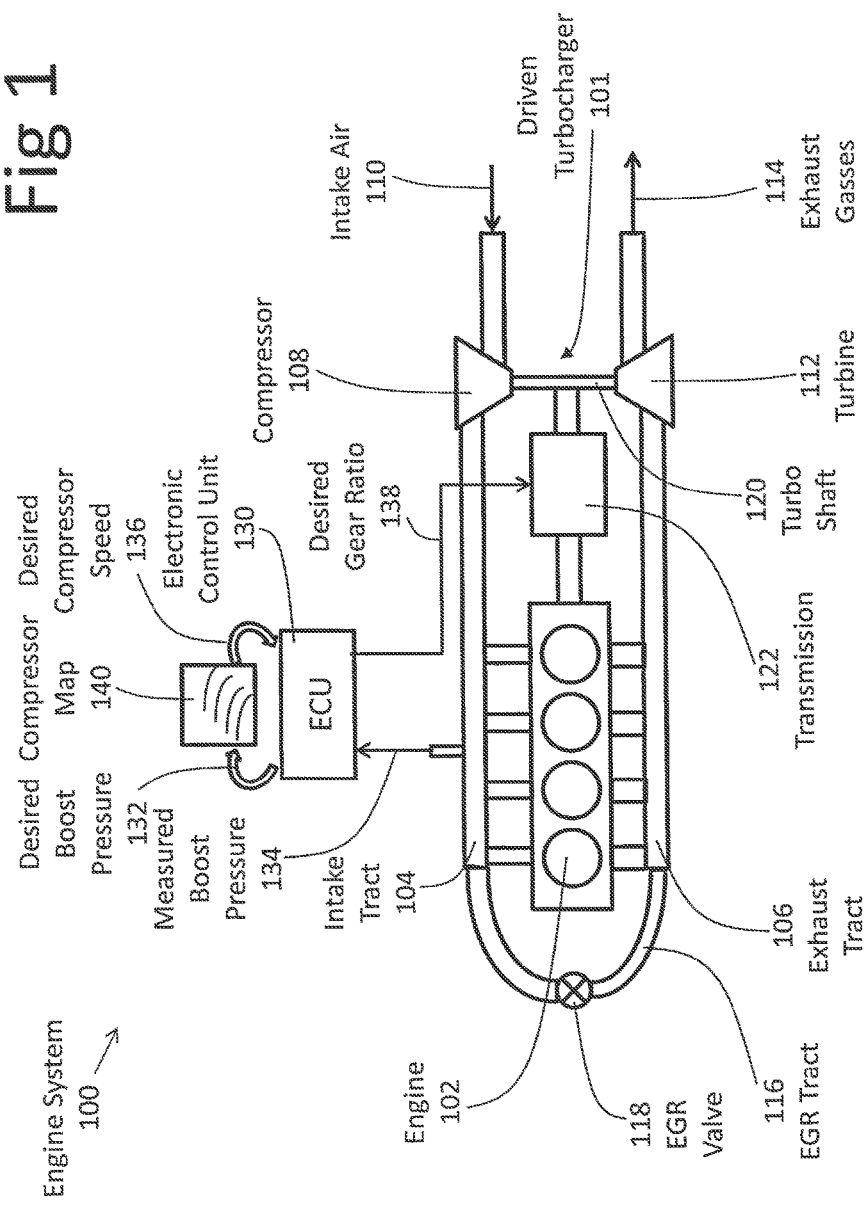

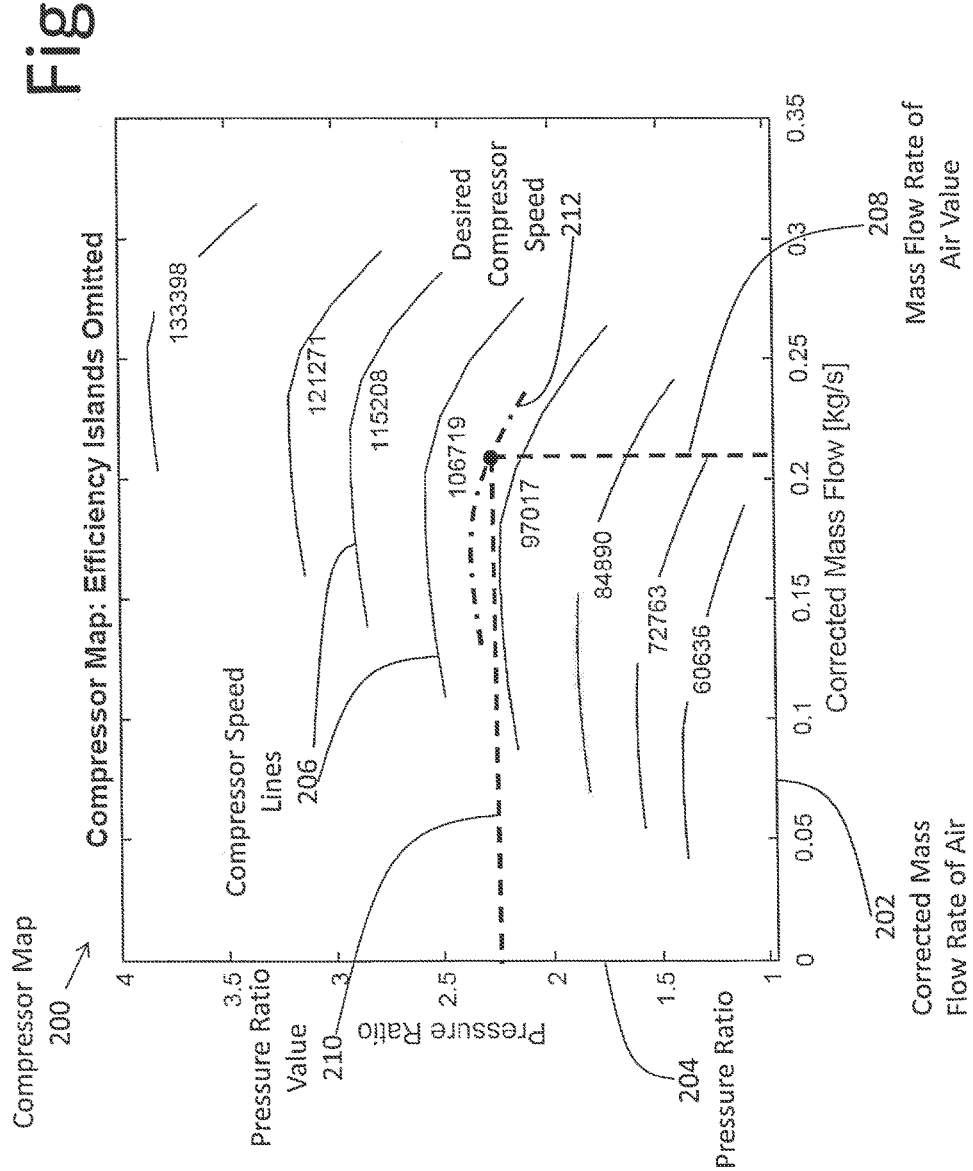

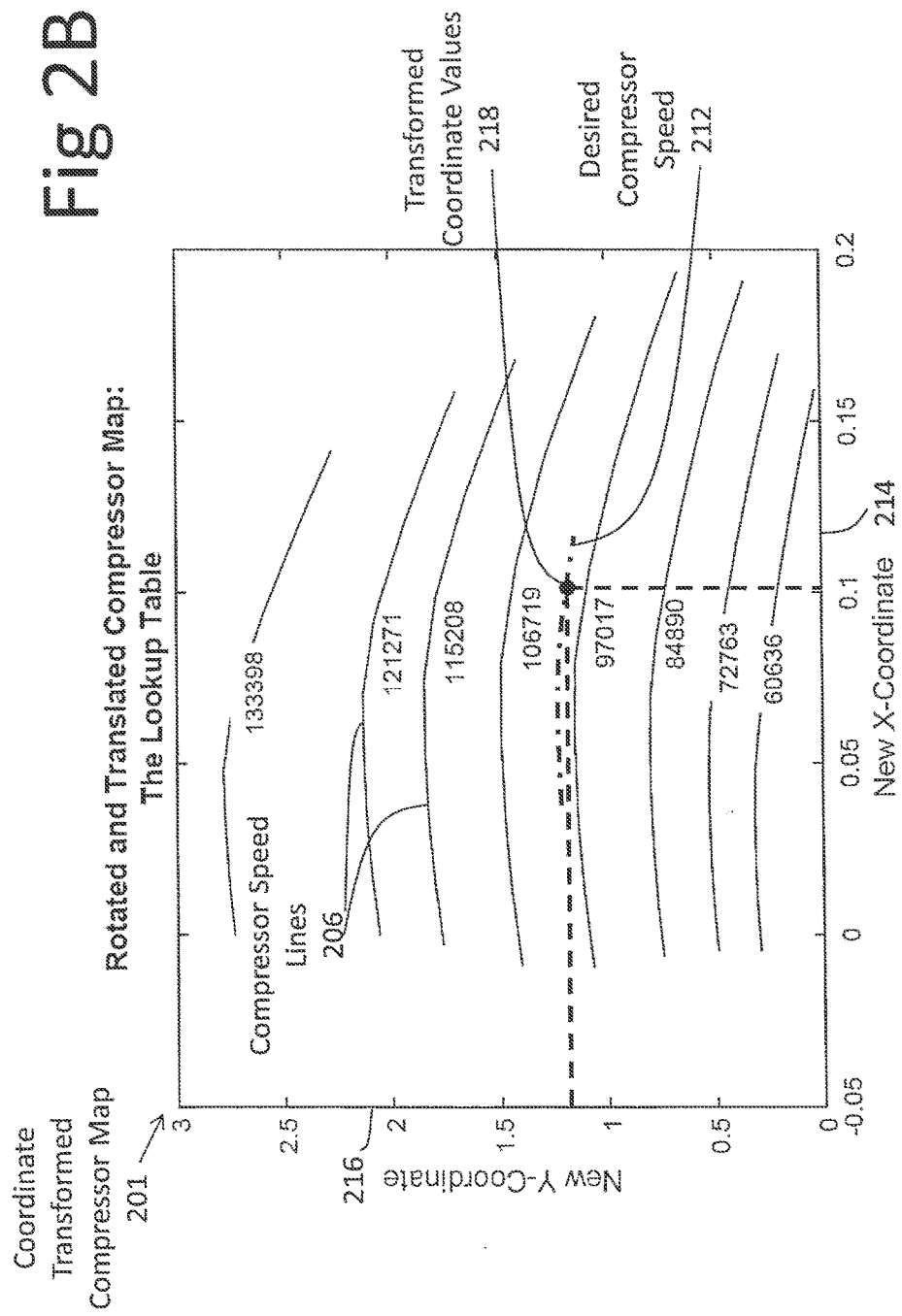

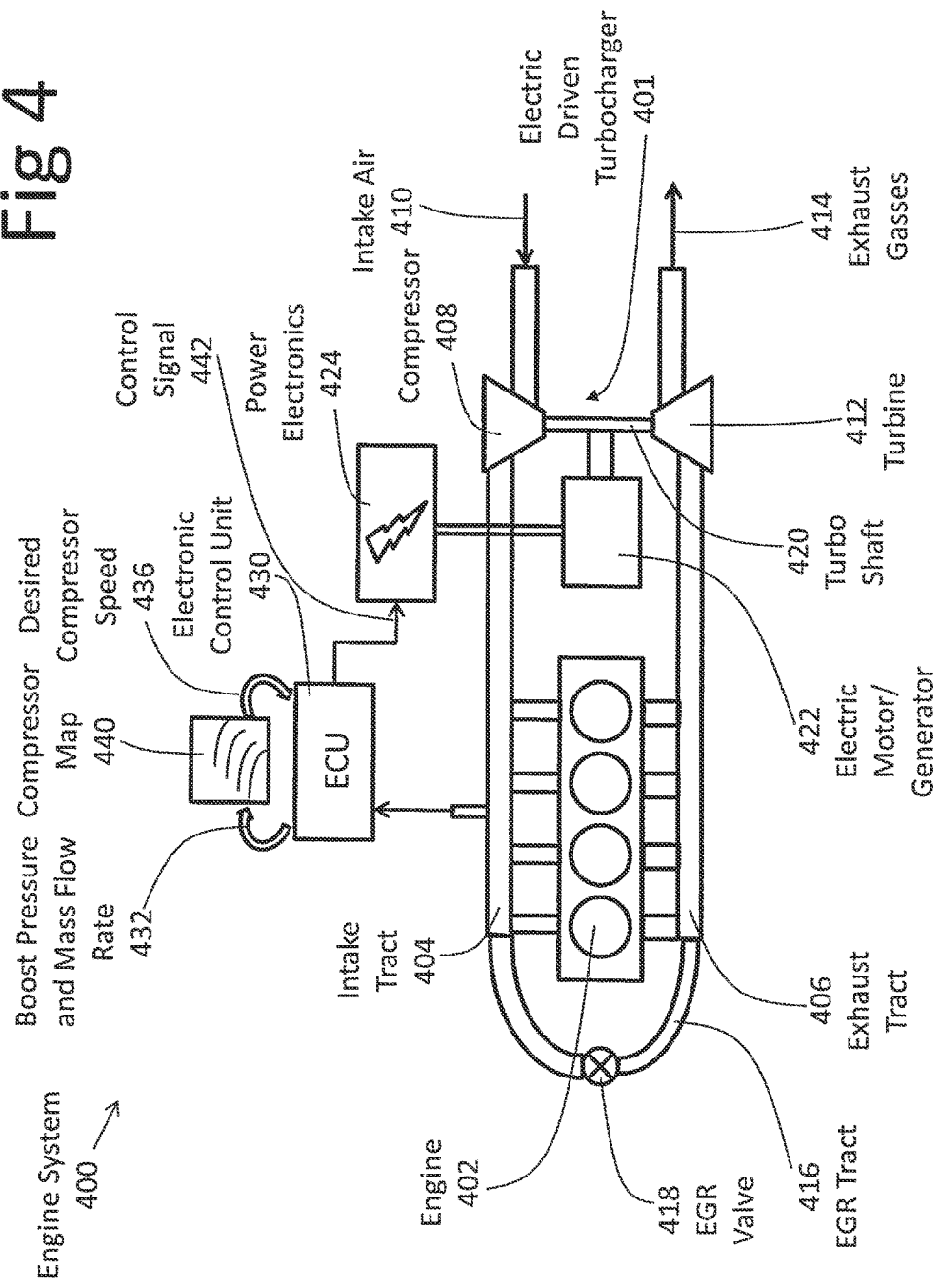

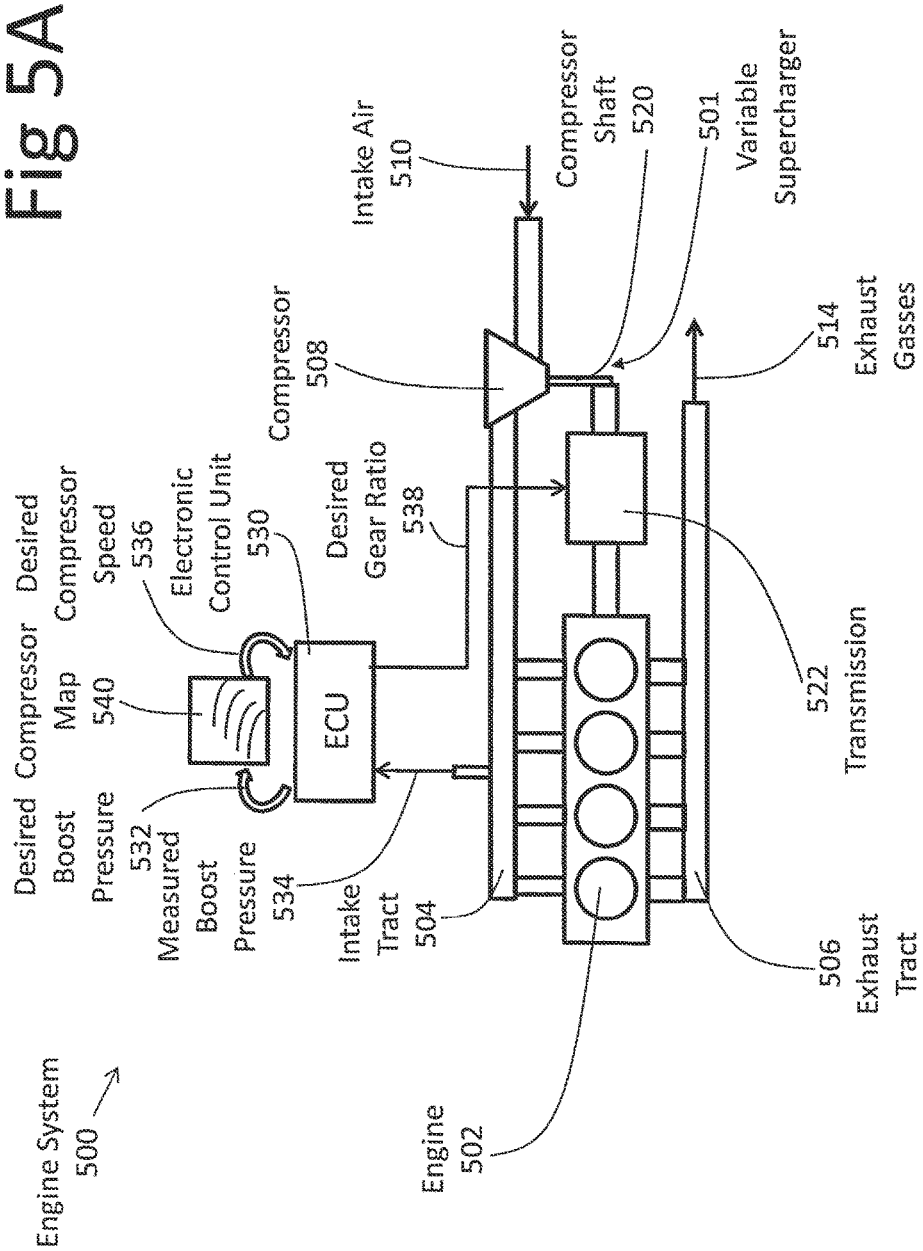

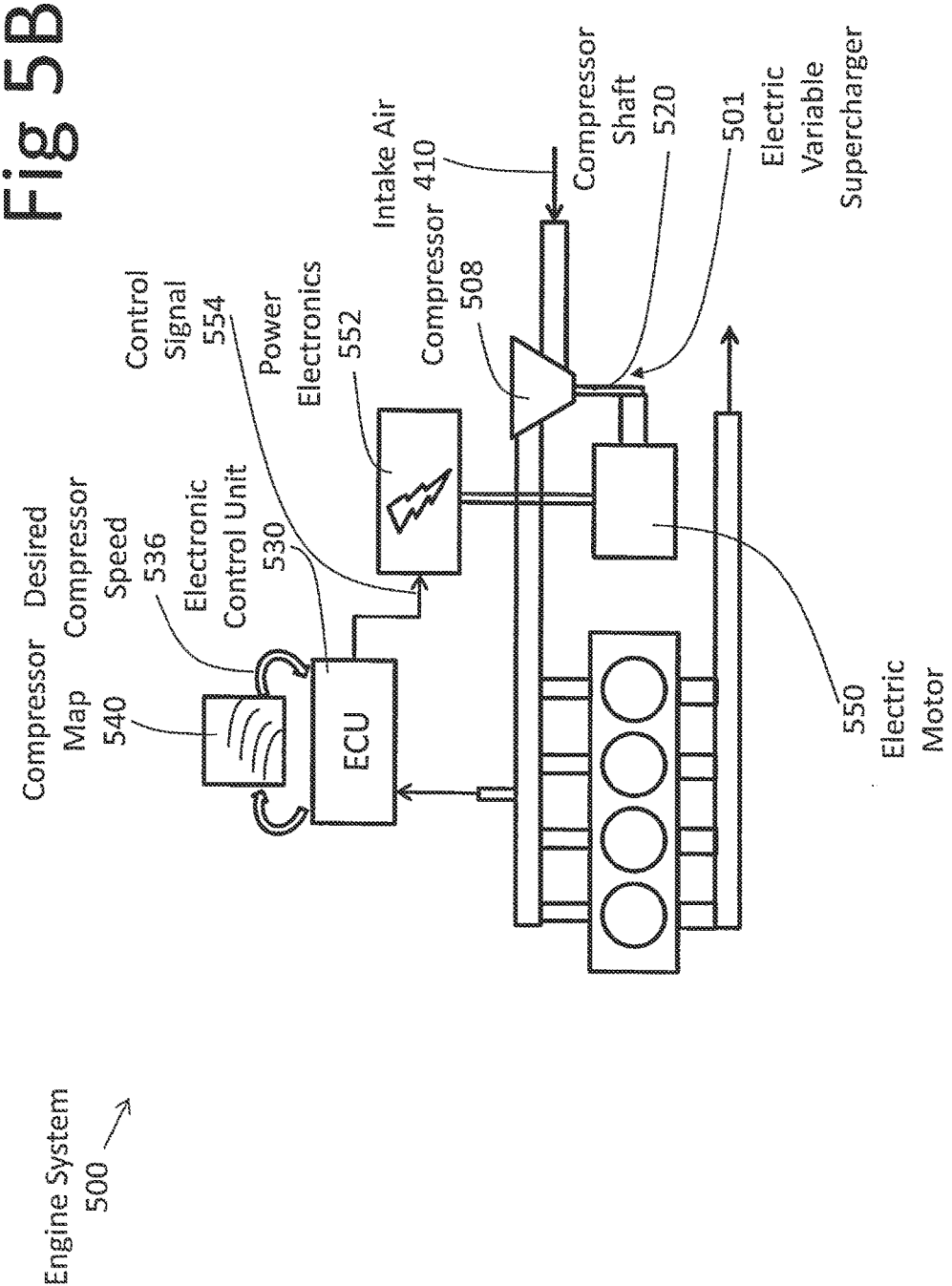

COMPRESSOR MAP BASED DRIVEN TURBOCHARGER CONTROL SYSTEM

BACKGROUND OF THE INVENTION

Driven turbochargers provide an alternative to both superchargers and turbochargers. Driven turbochargers may reduce turbo lag, by allowing the engine system to drive the compressor when there is an insufficient amount of exhaust gasses to drive the turbine. This is accomplished through either a mechanical connection through a transmission from the crankshaft, or an electric motor connected to the engine electrical system, either of which in turn transfers power to or from the turbo shaft. Driven turbochargers can provide turbo-compounding when excess exhaust energy is present, which drives the turbine during high engine load conditions.

SUMMARY OF THE INVENTION

An embodiment of the invention may therefore comprise a method of controlling a driven turbocharger for an engine system comprising pressurizing intake air, by a compressor of the driven turbocharger, extracting power, by a turbine of the driven turbocharger, from exhaust gasses of the engine system, mechanically coupling, via a transmission, the driven turbocharger to the engine system, receiving, at a control unit, a desired boost pressure for the intake air from the engine system, calculating, at the control unit, a mass flow rate of the intake air from an operating speed of the engine system and operating conditions of the engine system that corresponds to the desired boost pressure, determining a desired compressor speed that corresponds to the desired boost pressure and the mass flow rate of the intake air from a compressor map, and shifting the transmission to a ratio that drives the compressor to the desired compressor speed to provide the engine system with the desired boost pressure of the intake air.

An embodiment of the invention may further comprise a method of controlling a driven turbocharger for an engine system comprising pressurizing intake air, by a compressor of the driven turbocharger, extracting power, by a turbine of the driven turbocharger, from exhaust gasses of the engine system, mechanically coupling, via a transmission, the driven turbocharger to the engine system, receiving, at a control unit, a desired mass flow rate for the intake air from the engine system, calculating, at the control unit, a boost pressure of the intake air from operating speed and conditions of the engine system that corresponds to the desired mass flow rate, determining a desired compressor speed that corresponds to the desired mass flow rate and the boost pressure of the intake air from a compressor map, and shifting the transmission to a ratio that drives the compressor to the desired compressor speed to provide the engine system with the desired mass flow rate of the intake air.

An embodiment of the invention may further comprise an engine system, the engine system comprising a variable supercharger, a compressor, of the variable supercharger, that compresses intake air for the engine system, an electronic control unit that generates a desired first state of the intake air, calculates a corresponding second state of the intake air, the second state depending on operating conditions of an engine of the engine system, and uses a compressor map for the compressor to determine a desired compressor speed, wherein the desired compressor speed corresponds to the first state and the second state of the intake air, a transmission that couples the engine to the compressor, wherein the transmission receives a control signal from the electronic control unit and shifts to a ratio that drives the compressor to the desired compressor speed.

An embodiment of the invention may further comprise a method for controlling an electric supercharger for an engine system, the engine system comprising an engine, a compressor that supplies compressed intake air to an intake tract of the engine, and an electric motor coupled to the compressor and power electronics of the engine system, the method comprising receiving a desired boost pressure for the intake air from the engine system, calculating a mass flow rate of the intake air from an operating speed of the engine and operating conditions of the engine that corresponds to the desired boost pressure, determining a desired compressor speed that corresponds to the desired boost pressure and the mass flow rate of the intake air from a compressor map, and driving the electric motor with the power electronics to a rotational speed that will spin the compressor at the desired compressor speed.

An embodiment of the invention may further comprise a method for controlling an electric supercharger for an engine system, wherein the engine system comprises an engine, a compressor that supplies compressed intake air to an intake tract of the engine, and an electric motor coupled to the compressor and power electronics of the engine system, the method comprising receiving a desired mass air flow for the intake air from the engine system, calculating a boost pressure of the intake air from an operating speed of the engine and conditions of the engine that corresponds to the desired mass air flow, determining a desired compressor speed that corresponds to the desired mass flow rate and the boost pressure of the intake air from a compressor map, and driving the electric motor with the power electronics to a rotational speed that will spin the compressor at the desired compressor speed.

An embodiment of the invention may further comprise an engine system, the engine system comprising an engine, an electric supercharger, a compressor of the electric supercharger that compresses intake air for the engine system, an electronic control unit that generates a desired first state of the intake air, calculates a corresponding second state of the intake air, the second state depending on operating conditions of the engine, and uses a compressor map for the compressor to determine a desired compressor speed, wherein the desired compressor speed corresponds to the first state and the second state of the intake air; an electric motor that couples the compressor to power electronics of the engine system, receives a control signal from the electronic control unit and spins at a rotational speed that drives the compressor to the desired compressor speed.

BRIEF DESCRIPTION OF THE DRAWINGS

FIG. 1 is a schematic of an engine system with a driven turbocharger.

FIG. 2A is a compressor map for a centrifugal compressor.

FIG. 2B is a compressor map that has undergone a coordinate transformation.

FIG. 4 is a schematic of an engine system with an electric driven turbocharger.

FIG. 5A is a schematic of an engine system with a mechanical supercharger.

FIG. 5B is a schematic of an engine system with an electric supercharger.

DETAILED DESCRIPTION OF THE EMBODIMENTS

Figure 3:
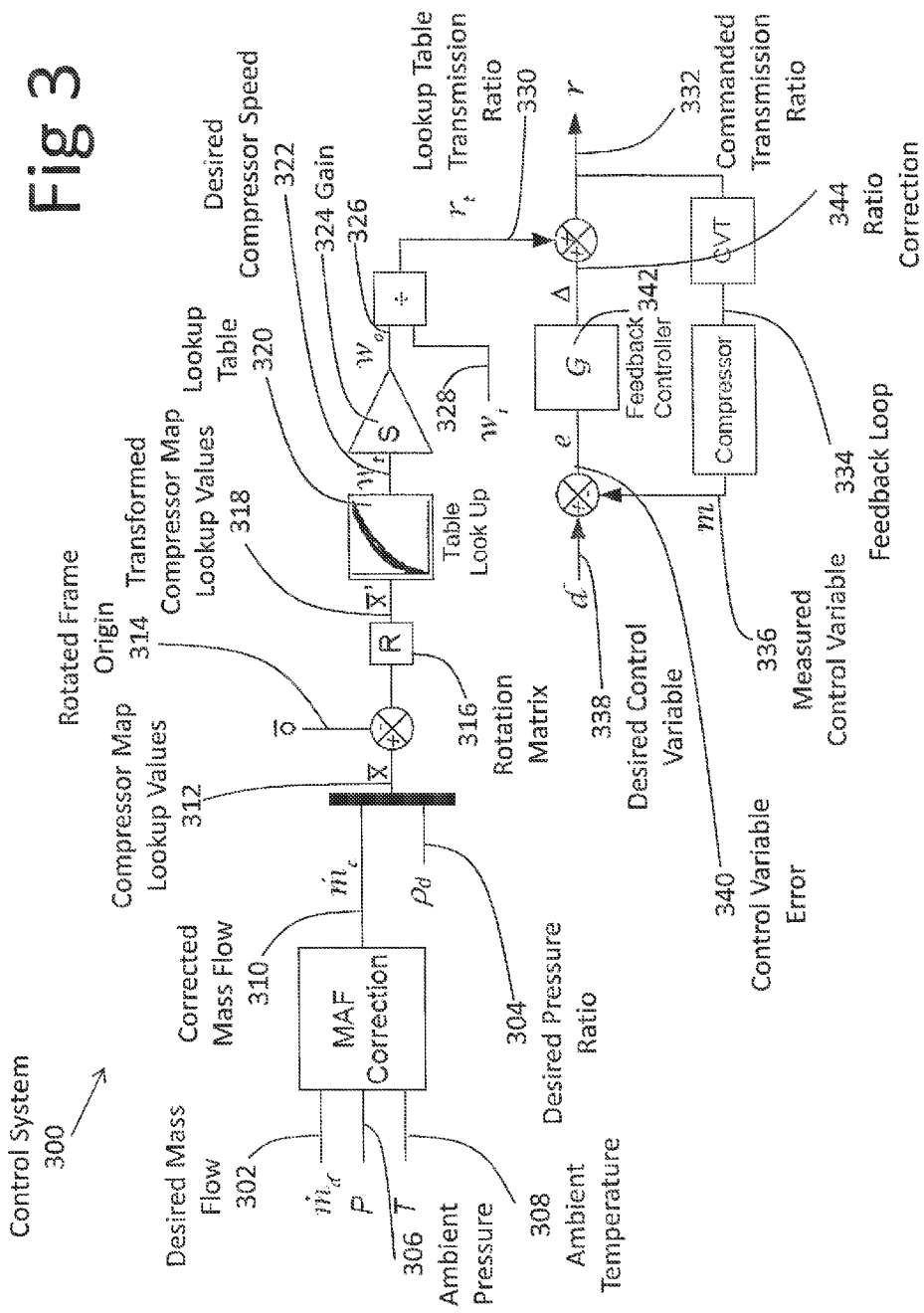
FIG. 3 is a diagram of a control system with speed line lookup and feedback loop.

FIG. 1 is a schematic of an engine system 100 with a driven turbocharger 101. Engine 102 has an intake tract 104 that supplies charge air to the engine 102, as well as an exhaust tract 106 that expels exhaust gasses 114 from the engine 102. Compressor 108 compresses intake air 110 that is supplied to intake tract 104. Turbine 112 receives exhaust gasses 114 from the exhaust tract 106 and extracts power from the exhaust gasses 114. On some engine applications, an EGR (Exhaust Gas Recirculation) tract 116 may be present that enables exhaust gas recirculation from exhaust tract 106 to intake tract 104. In these cases, EGR valve 118 controls the amount of EGR flow through EGR tract 116. Turbo shaft 120 connects compressor 108 and turbine 112, and is mechanically coupled to transmission 122. This mechanical coupling may be in the form of a high speed traction drive. A high speed traction drive system is disclosed in U.S. Pat. No. 8,561,403, issued. Oct. 22, 2013, entitled "Super-Turbocharger Having a High Speed Traction Drive and a Continuously Variable Transmission" which is specifically incorporated herein by reference for all that it discloses and teaches. Transmission 122 is mechanically coupled to engine 102. Transmission 122 has a variable ratio so that shifting transmission 122 can control the rotational speed of turbo shaft 120 with varying rotational speeds and operating conditions of engine 102. Transmission 122 is preferably a mechanical CVT (continuous Variable Transmission), with the ability to finely adjust ratio. Transmission 122 may also be a multi-speed, discreet geared transmission. Those skilled in the art will understand and appreciate the operation of a mechanical CVT and a multi-speed, discreet geared transmission.

Engine system 100 is electronically controlled by electronic control unit 130. Electronic control unit 130 determines a desired boost pressure 132 for intake tract 104 that is dependent on engine speed and operating conditions. The electronic control unit 130 also receives a measured boost pressure 134 from the intake tract 104. The electronic control unit 130 may utilize this measured boost pressure. Instead of only relying on feedback control from a measured boost pressure 134, it is possible to have a faster, more stable control system by directly shifting the transmission 122 to a ratio that provides the desired boost pressure 132. The electronic control unit 130 supplies the desired gear ratio to the transmission 122 based on calculations related to the measured boost pressure 134, the desired boost pressure 132, and a resultant desired compressor speed 136 from a compressor map 140. More specifically, this is accomplished by calculating a mass flow rate of the intake air 110 that corresponds to the desired boost pressure 132 and operating conditions of the engine 102. Once a boost pressure and a mass flow rate for the intake air 110 is determined for a given operating condition, these parameters are used to determine a desired compressor speed 136 using the compressor map 140 for compressor 108. As is standard for compressor maps, the mass flow rate of the intake air 110 is corrected, based on conditions (pressure, temperature, and gas properties as described below) of the inlet air to the compressor 108, and a pressure ratio across the compressor 108 is determined from the boost pressure divided by the inlet pressure. The compressor map 140 is used as a lookup table, with the corrected mass flow and pressure ratio as inputs, and the desired compressor speed 136 as an output back to the electronic control unit 130. The compressor map 140 may undergo a coordinate rotation or transformation to simplify the compressor speed lookup as described below. The output compressor speed is the desired compressor speed 136 for the engine operating point. Knowing the RPM (Revolutions Per Minute) of the engine 102 allows calculating a desired gear ratio 138 of transmission 122. Shifting transmission 122 to this desired gear ratio will then drive compressor 108 to the desired compressor speed 136.

An example of the calculation of mass flow rate of the intake air 110 using parameters and operating conditions of the engine 102 is as follows:

$$\dot{M}_{air} = \left[ \frac{\frac{Engine_{RPM}}{120,000} * Engine_{Disp} * \eta_v}{\frac{EGR_{frac}}{1-EGR_{frac}} * T_{EGR} + T_{air}} \right] * \frac{P_{boost}}{R}$$

Where $\dot{M}$ is the mass flow of intake air 110

$Engine_{RPM}$ is the rotational RPM of the engine 102

$Engine_{Disp}$ is the displacement of the engine 102 in liters $\eta_v$ is the volumetric efficiency of the engine 102

$EGR_{frac}$ is the EGR fraction of the intake to the engine 102

$T_{EGR}$ is the temperature of the EGR flow in Kelvin $T_{air}$ is the temperature of the air flow in Kelvin $P_{boost}$ is the desired boost pressure 132, in Pascals absolute R is the gas constant in J/kgK.

A simplification of the above equation can be derived by noting that the mass flow rate of the intake air 110 is proportional to the boost pressure of the intake air 110. Therefore, assuming the engine operating conditions do not change significantly between similar operating points, a measured air mass flow rate can be utilized, along with the desired boost pressure 132 and a measured boost pressure 134 of intake air 110. This simplified calculation is:

$$\dot{M}_{air} = \dot{M}_{air} measured * \frac{P_{boost} \text{desired}}{P_{boost} \text{measured}}$$

If the electronic control unit 130 keeps the operating conditions of the engine 102 close to the desired operating conditions of the engine 102, then this simplified equation provides an estimation of a desired mass flow rate of the intake air 110 for a given desired boost pressure 132. An alternative is to use a lookup table based on engine operating conditions to give a mass flow rate of the intake air 110.

The above equations are based on the electronic control unit 130 generating a desired boost pressure 132 and calculating a corresponding mass flow rate of intake air 110. The electronic control unit 130 can also operate by determining a desired mass flow rate of intake air 110 based on engine operating conditions and calculating a corresponding boost pressure of the intake air 110. The equations above can be re-ordered, to produce a calculated boost pressure of the intake air 110 from a desired mass flow rate 138 of the intake air 110:

$$P_{boost} = \left[\frac{\frac{EGR_{frac}}{1-EGR_{frac}} * T_{EGR} + T_{air}}{\frac{Engine_{RPM}}{120,000} * Engine_{Disp} * \eta_v}\right] * \dot{M}_{air} * R$$

$$P_{boost} = P_{boost}\text{measured} * \frac{\dot{M}_{air}\text{desired}}{\dot{M}_{air}\text{measured}}$$

As noted previously, the calculated boost pressure of intake air 110 may also be determined from a lookup table based on engine operating conditions. In the same way, the end result is a mass flow rate and a boost pressure of intake air 110 to input into a compressor map for compressor 108.

FIG. 2A depicts a compressor map 200 for a centrifugal compressor, such as compressor 108 of FIG. 1. The x-axis shows corrected mass flow rate of air 202 and the y-axis shows pressure ratio 204. Compressor speed lines 206 show where on the map the compressor operates for a given compressor speed. The values of boost pressure and mass flow rates of intake air from FIG. 1 that correspond to the desired engine operating condition are used to determine the corrected mass flow rate of air value 208 and pressure ratio value 210 to input into the compressor map 200 to determine a desired compressor speed 212. The pressure ratio value 210 is calculated by the desired boost pressure divided by the compressor inlet pressure. The corrected mass flow rate of air value 208 is determined by the standard equation:

$$\dot{M}_{cor} = \dot{M}_{act} * \left[\frac{P_{ref}}{P_{inlet}}\right] * \sqrt{\frac{\gamma_{ref}}{\gamma_{inlet}} \frac{R_{inlet}}{R_{ref}} \frac{T_{inlet}}{T_{ref}}}$$

Assuming that the intake air 110 gas constant properties always match the reference values, this corrected mass flow rate of air calculation can be simplified to:

$$\dot{M}_{cor} = \dot{M}_{act} * \left[\frac{P_{ref}}{P_{inlet}}\right] * \sqrt{\frac{T_{inlet}}{T_{ref}}}$$

Once the proper corrected mass flow rate of air value 208 and the pressure ratio value 210 are determined, various methods of interpolation can be used between the given speed lines 206 to determine the desired compressor speed 212. Those skilled in the art will understand the various methods of interpolation that may be used to determine a desired compressor speed 212. For example, linear interpolation or a spline interpolation can be used.

FIG. 2B shows a compressor map 200 that has undergone a coordinate transformation to form coordinate transformed compressor map 201 in order to facilitate looking up the desired compressor speed 212. Compressor speed lines 206 have the values for corrected mass flow rate of air 202 and pressure ratio 204 converted to a new x-coordinate 214 and a new y-coordinate 216. This conversion is done through a standard rotation and translation calculation of $X' = R[X - O]$ Where
  X' is the new x-coordinate 214 and new y-coordinate 216
  X is the corrected mass flow rate of air 202 and pressure ratio 204
  O is the origin coordinates for the transformation
  R is the rotation matrix for the transformation and is of the form $$\begin{bmatrix} \cos\theta & -\sin\theta \\ \sin\theta & \cos\theta \end{bmatrix}$$

where θ is the rotation angle of the transformation

The corrected mass flow rate of air value 208 (see FIG. 2A) and the pressure ratio value 210 (see FIG. 2A) also undergo this coordinate transformation for use on the new lookup table, the coordinate transformed compressor map 201. For the example compressor map 200 shown in FIG. 2A, the origin coordinates are [0.0280721; 1.087731] and the rotation matrix is [cos(3.86°)−sin(3.86°); sin(3.86°) cos(3.86°)]. Applying these to the example corrected mass air flow rate value 208 of 0.21 kg/s and pressure ratio value 210 of 2.25 shown in FIG. 2A gives transformed coordinate values 218 of [0.103; 1.17] that are input as lookup values into coordinate transformed compressor map 201 to determine desired compressor speed 212.

FIG. 3 shows a diagram of a control system 300 with speed line lookup and feedback loop. Inputs to the system include desired mass flow 302, desired pressure ratio 304 (as discussed in regard to FIG. 2A), as well as ambient pressure 306 and ambient temperature 308. Desired mass flow 302 is corrected according to the formula discussed above using ambient pressure 306 and ambient temperature 308. The correction provides a corrected mass flow 310 to the compressor map lookup along with desired pressure ratio 304. These two values comprise compressor map lookup values 312 for the lookup table in FIG. 2A. In order to simplify the compressor map lookup table, compressor map lookup values 312 undergo the same coordinate transformation as the compressor map, as described in FIG. 2B. This coordinate transformation involves subtracting out the rotated frame origin 314 from the compressor map lookup values 312, and multiplying the result by a rotation matrix 316, as described above in connection to FIG. 2B, to produce transformed compressor map lookup values 318. These transformed compressor map lookup values 318 are input into lookup table 320, which corresponds to the transformed compressor map from FIG. 2B. The output of this lookup table 320 is a desired compressor speed 322 that is then converted to a corresponding lookup table transmission ratio 330. This conversion involves multiplying desired compressor speed 322 by a gain 324 based on the design of the driven turbocharger to obtain a transmission output speed 326, and dividing this transmission output speed by a transmission input speed 328. In a simplified embodiment without feedback control, this lookup table transmission ratio 330 comprises the commanded transmission ratio 332 that is then output to the transmission 122 in FIG. 1. In the embodiment shown in FIG. 3, an additional correction is made to the transmission ratio through a feedback loop 334. Feedback loop 334 subtracts a measured control variable 336 to a desired control variable 338 to produce a control variable error 340. Measured control variable 336 and desired control variable 338 can be intake air boost pressures, intake air mass flows, or other engine system variables. Control variable error 340 is input to feedback controller 342 which produces a ratio correction 344. Feedback controller 342 may utilize a PID (Proportional-Integral-Derivative) control strategy or any other feedback control strategy. Those skilled in the art will understand feedback control strategies. Ratio correction 344 is then added to lookup table transmission ratio 330 to produce commanded transmission ratio 332.

FIG. 4 shows a schematic of an engine system 400 with an electric driven turbocharger 401. The functionality is similar to the system described in FIG. 1, except the turbocharger is driven electrically instead of mechanically. Those skilled in the art will understand the operation of mechanically driven turbochargers and electrically driven turbochargers. Engine 402 has an intake tract 404 that supplies charge air to the engine 402, as well as an exhaust tract 406 that expels exhaust gasses 414 from the engine 402. Compressor 408 compresses intake air 410 that is supplied to intake tract 404. Turbine 412 receives exhaust gasses 414 from the exhaust tract 406 and extracts power from the exhaust gasses 414. On some engine applications, an EGR tract 416 may be present that enables exhaust gas recirculation from exhaust tract 406 to intake tract 404. In these cases, EGR valve 418 controls the amount of EGR flow through EGR tract 416. Turbo shaft 420 connects compressor 408 and turbine 412, and is mechanically coupled to electric motor/generator 422. This mechanical coupling may be in the form of a high speed traction drive, previously discussed in regard to FIG. 1, or can be a direct connection. Electric motor/generator 422 is electrically coupled to power electronics 424 of engine system 400. Power electronics 424 enable electric power to flow between electric motor/generator 422 and engine system 400. This flow of electric power can control the rotational speed of motor/generator 422.

Engine system 400 is electronically controlled by electronic control unit 430. In the same manner as in FIG. 1, electronic control unit 430 determines a boost pressure and mass flow rate 432 for intake air 410 that is dependent on engine speed and operating conditions such as engine load. These values are then input to a compressor map 440 for compressor 408 to generate a desired compressor speed 436. Electronic control unit 430 outputs a control signal 442 to power electronics 424, which then electrically powers electric motor/generator 422 to a rotational speed that drives turbo shaft 420 and thus compressor 408 to desired compressor speed 436.

FIG. 5A shows a schematic of an engine system 500 with a variable supercharger 501. Engine 502 has an intake tract 504 that supplies charge air to the engine 502, and an exhaust tract 506 that expels exhaust gasses 514 from the engine 502. Compressor 508 compresses intake air 510 that is supplied to intake tract 504. Compressor shaft 520 is connected to compressor 508 and is mechanically coupled to transmission 522. This mechanical coupling may be in the form of a high speed traction drive, previously discussed in regard to FIG. 1. Transmission 522 is mechanically coupled to engine 502, and has a variable ratio so that shifting transmission 522 can control the rotational speed of turbo shaft 520 with varying rotational speeds and operating conditions of engine 502. Engine system 500 is electronically controlled by electronic control unit 530. Electronic control unit 530 determines a desired boost pressure 532 for intake tract 504 that is dependent on engine speed and operating conditions. A corresponding mass flow rate of the intake air 510 to the desired boost pressure 532 is calculated based on operating conditions of the engine 502. The boost pressure and mass flow rate for the intake air 510 are input to a compressor map 540 for compressor 508 to determine a desired compressor speed 536 for the operating point. A measured boost pressure 534 can also be used for an additional feedback control loop to fine-tune desired compressor speed 536. Electronic control unit outputs a desired gear ratio 538 signal to transmission 522, which shifts transmission 522 to drive compressor 508 to the desired compressor speed 536.

FIG. 5B shows a schematic of the engine system 500 from FIG. 5A, but with an electric variable supercharger 501. The overall operation follows the description in FIG. 5A, except that turbo shaft 520 is coupled to an electric motor 550, which in turn is electrically coupled to engine system 500 through power electronics 552. Desired compressor speed 536 is determined from compressor map 540 by electronic control unit 530 in the same was as described in FIG. 5A. Electronic control unit 530 outputs a control signal 554 to power electronics 552, which then powers electric motor 550 to drive compressor 508 to the desired compressor speed 536.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of controlling a variable supercharger for an engine system comprising:
   pressurizing intake air, by a compressor of said variable supercharger to supply said intake air to an intake tract of an engine of said engine system;
   driving said variable supercharger with a transmission;
   receiving, at a control unit, a desired first state of airflow of said intake air in said intake tract of said engine from said engine system;
   calculating, in said control unit, a second state of airflow of said intake air in said intake tract of said engine from an operating speed of said engine system and operating conditions of said engine system that corresponds to said desired first state;
   determining a desired compressor speed that corresponds to said desired first state of airflow of said intake air in said intake tract of said engine and said second state of airflow of said intake air in said intake tract of said engine from a compressor map, wherein said compressor map is a lookup table, with mass flow and pressure ratio of said compressor as inputs, and compressor speed as an output;
   shifting said transmission to drive said compressor to said desired compressor speed to provide said engine system with said desired first state of said intake air.

2. The method of claim 1 where said first state of said intake air is a boost pressure of said intake air and said second state of said intake air is a mass flow rate of said intake air.

3. The method of claim 1 where said first state of said intake air is a mass flow rate of said intake air and said second state of said intake air is a boost pressure of said intake air.

4. The method of claim 1 further comprising:
   coupling a turbine to said compressor, that extracts power from exhaust gasses of said engine system, to form a driven turbocharger.

5. The method of claim 1 where said transmission comprises an electric motor coupled to power electronics of said engine system to form an electric variable supercharger.

6. The method of claim 5 further comprising:
a speed step-down transmission between said compressor and said electric motor such that said electric motor rotates at a reduced speed.

7. The method of claim 6 where said speed step-down transmission comprises a traction drive.

8. The method of claim 5 further comprising:
coupling a turbine to said compressor, that extracts power from exhaust gasses of said engine system, to form an electric driven turbocharger.

9. The method of claim 1 where said transmission comprises a mechanical continuously variable transmission that is mechanically coupled to said compressor and an engine of said engine system.

10. The method of claim 9 further comprising:
a speed step-down transmission between said compressor and said mechanical continuously variable transmission such that said mechanical continuously variable transmission rotates at a reduced speed.

11. The method of claim 10 where said speed step-down transmission comprises a traction drive.

12. The method of claim 2 further comprising:
obtaining a measured boost pressure of said intake air;
providing a feedback control loop comparing said measured boost pressure of said intake air to said desired boost pressure for said intake air that adjusts said ratio of said transmission to match said measured boost pressure of said intake air to said desired boost pressure for said intake air.

13. The method of claim 12 wherein said feedback control loop comprises a Proportional Integral Derivative control strategy.

14. The method of claim 2 wherein said method of calculating said mass flow rate of said intake air comprises using a plurality of variables in a calculation, said plurality of variables comprising engine displacement, engine speed, said desired boost pressure, Exhaust Gas Recirculation fraction, and volumetric efficiency of said engine system.

15. The method of claim 2 wherein said method of calculating said mass flow rate of said intake air comprises scaling a measured mass flow rate of said intake air by a ratio of said desired boost pressure divided by a measured boost pressure of said intake air.

16. The method of claim 2 wherein said method of calculating said mass flow rate of said intake air comprises using a lookup table based on operating speed and operating conditions of said engine system.

17. The method of claim 1, said method further comprising applying a transformation to said compressor map.

18. An engine system, said engine system comprising:
a variable supercharger;
a compressor, of said variable supercharger, that compresses intake air for an intake tract of an engine of said engine system;
an electronic control unit that generates a desired first state of airflow of said intake air in said intake tract of said engine, calculates a corresponding second state of airflow of said intake air in said intake tract of said engine, said second state depending on operating conditions of an engine of said engine system, and uses a compressor map for said compressor to determine a desired compressor speed, wherein said desired compressor speed corresponds to said first state of airflow of said intake air in said intake tract of said engine and said second state of airflow of said intake air in said intake tract of said engine, said compressor map comprising a lookup table, with mass flow and pressure ratio of said compressor as inputs, and compressor speed as an output;
a transmission that is coupled to said compressor, wherein said transmission receives a control signal from said electronic control unit and shifts to drive said compressor to said desired compressor speed.

19. The engine system of claim 18, wherein said desired first state of said intake air is a boost pressure of said intake air and said second state of said intake air is a mass flow rate of said intake air.

20. The engine system of claim 18, wherein said first state of said intake air is a mass flow rate of said intake air and said second state of said intake air is a boost pressure of said intake air.

21. The engine system of claim 18, wherein said transmission is a mechanical continuously variable transmission.

22. The engine system of claim 18, said engine system further comprising:
a turbine coupled to said compressor that receives exhaust gasses from said engine and produces power from said exhaust gasses.

23. The engine system of claim 18 where said transmission is an electric motor.

* * * * *